Figure 1:
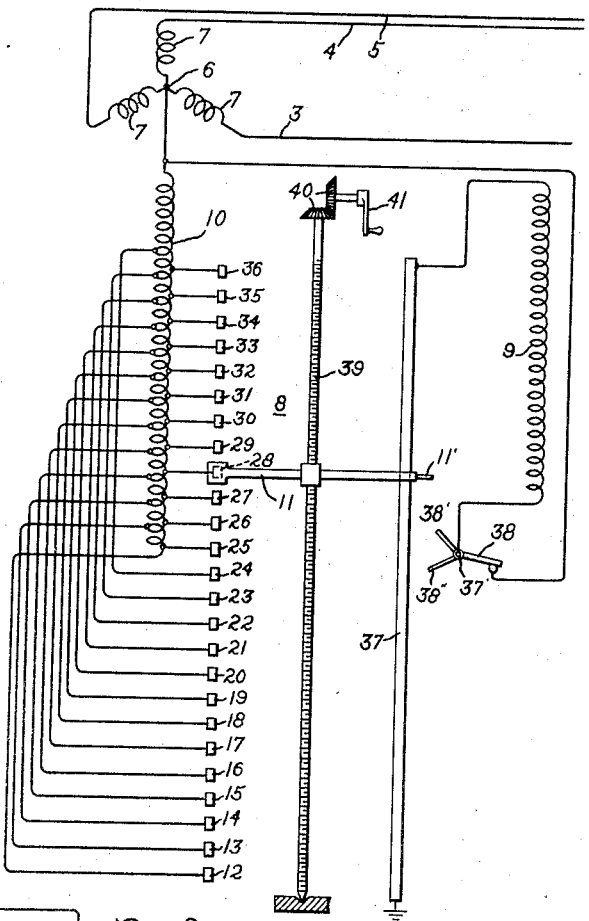

Dec. 10, 1940. A. U. WELCH, JR., ET AL 2,224,623
PROTECTION OF ALTERNATING CURRENT ELECTRIC SYSTEMS
Filed June 19, 1940

Inventors:
Alanson U. Welch Jr,
Levin W. Foster,
by Harry E. Dunham
Their Attorney.

Patented Dec. 10, 1940

2,224,623

UNITED STATES PATENT OFFICE 2,224,623

PROTECTION OF ALTERNATING CURRENT ELECTRIC SYSTEMS

Alanson U. Welch, Jr., and Levin W. Foster, Pittsfield, Mass., assignors to General Electric Company, a corporation of New York Application June 19, 1940, Serial No. 341,322

11 Claims. (Cl. 171—97)

Our invention relates to improvements in the protection of alternating current electric systems and more particularly to improvements in the protection of alternating current electric systems of the type in which a fault to ground on one phase conductor of the system substantially increases the voltage to ground of the other phase conductors of the system. More specifically, my invention relates to improvements in the protection of alternating current electric systems by arc suppression with ground fault neutralizers as fundamentally disclosed in United States Letters Patent 1,537,371 issued May 12, 1925, on an application filed by Waldemar Petersen.

In this Letters Patent there is disclosed the suppression of the capacitance current to ground of the ungrounded conductors of an alternating current electric system upon the occurrence of a ground on one conductor by a suitably proportioned inductive device or ground fault neutralizer which is usually connected between a neutral point of the system and ground. Upon the occurrence of a ground on one phase conductor, a lagging current flows in the ground fault neutralizer of such a value as effectively to suppress the capacitance current to ground at the grounded point, whereby to eliminate the ground fault providing it is of a transient character. In order to obtain the desired suppressing action, the inductance of the ground fault neutralizer has to be such that the circuit comprising this neutralizer and the capacitance to ground of the system phase conductors is substantially resonant at system fundamental frequency.

As long as the resultant capacitance current to ground of the phase conductors of the system is substantially zero, the neutral point of the system will be at substantially ground potential. If, however, due to any unbalance, a resultant capacitance current flows to ground, the neutral point is no longer at ground potential. This is equivalent to applying a voltage to a circuit consisting of inductance and capacitance in series tuned to the frequency of the applied voltage. The unbalance producing the flow of the residual capacitance current to ground may be due to the configuration of the system, an open conductor, failure of a switch to open or close one or more phase conductors, or sequential closing or opening of the phase conductors, or any cause which can establish the flow of an unbalanced capacitance current to ground from the phase conductors of the system. Accordingly, unless certain precautions are taken, the voltage of the system to ground may rise to a dangerous value.

In practice the magnetic circuit of a ground fault neutralizer includes air gaps and is so designed that the flux density of the iron core approaches saturation when the normal line to ground voltage of the system is impressed across the neutralizer. Accordingly, any rise in voltage above the normal line to ground voltage causes the current to increase more rapidly than the voltage whereby automatically to effect detuning. In other words, the circuit formed by the ground fault neutralizer and the capacitance of the system to ground will no longer be resonant at system fundamental frequency and at neutralizer voltages exceeding normal system line to ground voltage. Thus abnormally high voltages due to such resonance are thereby avoided.

In a sectionalized alternating current system the capacitance of the system to ground will vary in dependence on the amount of the system in service. Accordingly, it is usual to provide the ground fault neutralizer with suitable adjusting means, such as taps, so that its inductance can be varied to correspond to the different capacitances of the system to ground depending on the amount of the system in service. If the neutralizer is adjusted to resonant at system fundamental frequency with the capacitance of a portion of the system, the inductive reactance and consequently the effective turns required will be greater than when the neutralizer is adjusted to resonate with the capacitance of the whole system.

If the line to ground voltage is impressed across the neutralizer, the current passing therethrough and the flux in the core thereof will vary inversely with the number of the effective turns. Actually the current will be approximately proportional to $$\frac{1}{N^2}$$

and the flux to $$\frac{1}{N}$$

N being the number of effective turns of the neutralizer. Since automatic detuning occurs only when the voltage across the effective turns is high enough to cause saturation of the iron core because of the relation between the turns and the flux density, as pointed out above, it is obvious that a higher voltage will be required to cause saturation when the coil is used with only a portion of the system in service than when the whole system is in service.

Since the magnetic saturation of the iron circuit of the neutralizer is the principal feature for preventing dangerous overvoltages due to electrical resonance, it is necessary to limit the range of taps so that the core will saturate at a permissible overvoltage. Obviously a conflict arises between this requirement and the conditions which have to be met on an extensive system, the capacitance to ground of which varies greatly depending upon the amount of the system in service, since it is impossible with a single winding in the neutral to ground connection to provide a large enough range in neutralizing inductance and yet be certain of automatic detuning to avoid dangerous overvoltages in consequence of resonance. Also where a wide lagging current range is necessary, as in systems whose capacitance to ground may vary considerably, the use of a single tapped inductive winding necessitates, under certain tap connections, a great number of extended winding turns which by reason of transformer effect may be submitted to high voltages requiring costly insulation.

The principal object of our invention is to provide an improved ground fault neutralizer protective arrangement such that, even for an extensive system the capacitance to ground of which varies greatly with the amount of the system in service, the corresponding critical value of arc suppressing inductance is available without danger from overvoltages in consequence of series resonance between the system capacitance to ground and the inductance of the ground fault neutralizer. Another object of our invention is to provide a relatively simple and economical arrangement whereby the desired tuning adjustment for arc suppression on ground faults can be readily effected without interfering with the automatic detuning effect necessary to prevent resonance under unbalanced capacitance current conditions not due to ground faults. A further object of our invention is to provide a ground fault neutralizer which has a wide range of neutralizing current and in which the number of extended turns at any given value of inductance is minimized whereby to reduce insulation expense. These and other objects of our invention will appear in more detail hereinafter.

In accordance with our invention, we provide a ground fault neutralizer comprising a plurality of windings which are preferably on the same core structure. One of these windings has a fixed number of turns and operates under line to ground voltage of the system to maintain its core leg at a high flux density approaching saturation. Another winding has a closed iron magnetic circuit and requires a small amount of magnetizing current in comparison with the first winding. This other winding is tapped to have its number of turns variable and with its minimum number of turns operates to maintain its core leg at a high flux density approaching saturation.

For a given range of system capacitance to ground from the minimum value to some intermediate value, the tapped winding is used alone beginning with the whole winding, which is capable of maintaining the associated core at a flux density sufficiently high to insure automatic detuning on dangerous resonant overvoltages, and decreasing the number of turns to a minimum which maintains the core leg at a high flux density approaching saturation. As the system capacitance is increased from a larger intermediate value to the maximum value, the whole tapped winding is used in parallel with the first winding and the number of turns of the tapped winding decreased to the minimum as before without changing the connection of the first winding which is thus operated always at a high, substantially fixed flux density approaching saturation. Thus, in accordance with our invention, regardless of the amount of the system capacitance to ground, there is always available the critical amount of neutralizing inductance operating at a sufficiently high flux density to insure automatic detuning whereby to prevent dangerous resonant overvoltages. Also, in accordance with our invention, the switching means for varying the number of turns of the tapped winding is arranged automatically to effect the operation of the switching means which cuts in or out the first winding so as to insure the desired cooperative effects of the two windings.

Our invention will be better understood from the following description when considered in connection with the accompanying sheet of drawings, and its scope will be pointed out in the appended claims.

Figure 3:
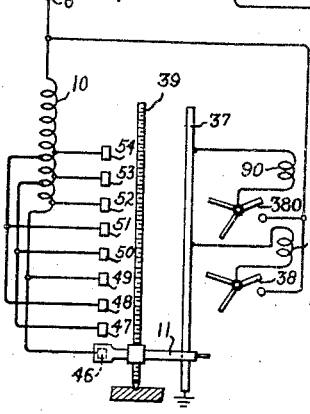
Figure 2:
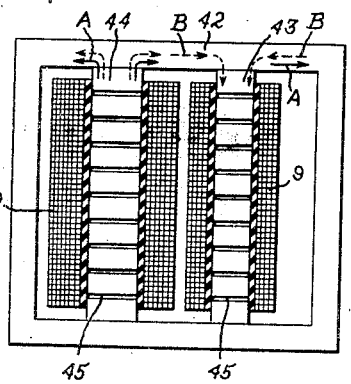

In the accompanying drawing Fig. 1 illustrates diagrammatically a ground fault neutralizer protective arrangement embodying our invention, Fig. 2 illustrates schematically a core and winding arrangement suitable for carrying out the embodiment of our invention shown in Fig. 1; and Fig. 3 illustrates diagrammatically a modification of the embodiment of our invention shown in Fig. 1.

In Fig. 1 we have illustrated our invention as applied to a three-phase alternating current electric system shown schematically as comprising phase conductors 3, 4 and 5 and having a neutral point 6 which may be established by the Y connected windings 7 of system apparatus, such as a transformer or otherwise, as is well known to the art. Obviously the system may have other neutral points, but they, together with the neutral point 6, are assumed to be so isolated from ground that the occurrence of a ground on any phase conductor substantially increases the voltage to ground of the other phase conductors. Also, as is customary practice in power systems of appreciable size, the system may be sectionalized by suitable means, such as circuit breakers, not shown, whereby any one or more portions of the system may be removed from or restored to service in accordance with power demands, maintenance, repairs, etc. As illustrated, the neutral point 6 is grounded through an arc suppressing inductive means 8 embodying our invention and in effect isolating the neutral point 6. Similar inductive means may be installed at other neutral points of the system, but for an understanding of our invention, it is sufficient to consider the arc suppressing equipment as installed at only one neutral point.

As illustrated, our arc suppressing means or ground fault neutralizer comprises a first winding 9 having a fixed number of turns and a second winding 10 whose number of turns can be varied through a predetermined range. In order to obtain the necessary inductance corresponding to the capacitance to ground of the system in service whereby to insure the required lagging current for suppressing the capacitance current to ground at a grounded point, we arrange, in accordance with our invention, to connect all or part of the second winding 10 between the neutral point 6 and ground and to have the first winding 9 either open-circuited or in parallel with all or part of the winding 10. The connections may be selectively established by suitable means such as a tap-changing switch comprising a movable conducting member 11 which is operative to connect any one of the taps 12 to 36, inclusive, associated with the winding 10 to ground through a conductor rail 37 for example. Preferably the portion of the conducting member 11, which engages the taps, is of sufficient extent to contact one tap before leaving another so as to avoid any possibility of current interruption between taps.

Further, in accordance with our invention, the tap-changing means may be arranged to control, at a predetermined point in the movement of the member 11, the cutting in and out of the winding 9 between the neutral point and ground. For this purpose there may be provided a position operated switch comprising a movable conducting member 38 which is arranged to be operated to the open position as the conducting member 11 moves from tap 25 to tap 24 and to be moved to the closed position as the conducting member 11 moves from tap 24 to tap 25. This may be accomplished by an extension 11' on the conducting member 11 which is arranged on its up and down movements to engage projecting arms 38' and 38" respectively on the member 38 to turn it about its pivotal support 37'. The actuation of the conducting member 11 may be effected in any suitable manner as by means of a threaded shaft 39 which engages the movable member 11 and which is arranged to be rotated by suitable gearing 40 either manually through an operating handle 41 or as otherwise desired.

In accordance with our invention, the windings 9 and 10 are mutually inductively related and for this purpose they may be positioned on a core structure 42 comprising a plurality of core legs as shown, for example, in Fig. 2. The magnetic factors are such that the number of turns of the winding 9, when under system line to ground voltage, are sufficient to maintain the core leg 43 on which this winding is placed at a high flux density approaching saturation. Similarly the operating range of turns of the winding 10 is such as to maintain at system line to ground voltage its core leg 44 at a high flux density approaching saturation. In order to insure the flow of the required amount of lagging or neutralizing current at line to ground voltage of the system, the core legs 43 and 44 are provided with suitable air gaps 45, as indicated. The connection and arrangement of the windings 9 and 10 is such that, when both are in service, the fluxes in the legs 43 and 44 tend to flow in opposite directions. However, when only the winding 10 is in service, the flux from this winding tends to divide and flow around through the outside core legs and return. Thus, when the tapped winding 10 alone is in service, the fluxes flow as indicated by the solid arrows A, but with both windings 9 and 10 in service, the fluxes flow as indicated by the dotted arrows B. With this arrangement it will be observed that the outer legs and the top and bottom yokes of the core require only about one-half the cross section of the winding legs.

Assuming that the minimum amount of the alternating current system is in service, then the maximum amount of inductance obtainable with our ground fault neutralizer is required. In this case the conducting member 11 is moved to engage the lowermost tap 12 and on its way to this position engages the arm 38" to open the switch 38 and thus to disconnect the winding 9. With the conducting member on tap 12, all of the winding 10 is connected in circuit between the neutral 6 and ground so as to obtain the maximum inductance from this winding alone. With the maximum amount of this winding in service, the density of the flux in its core leg will be such as automatically to detune under resonant conditions to avoid dangerous resonant overvoltages. As the system capacitance is increased by reason of more sections of the system in service the conducting member 11 is moved upwardly successively to engage the desired taps until it engages tap 24 which covers the minimum number of turns of the winding 10 and the smallest inductance obtainable with this winding alone. With this number of turns, the core leg 44 is on the verge of saturation. When further decrease in inductance is necessary because of the increased amount of the system in service, the conducting member 11 is moved from tap 24 to tap 25 thereby connecting between the neutral point and ground, all of the winding 10 and winding 9 in parallel therewith by the closing operation of the switch 38 as the conducting member engages the arm 38' in moving from tap 24 to tap 25. As the system capacitance increases further to the maximum amount, the conducting member 11 is moved from tap 25 through the desired taps to tap 36 which includes again a minimum amount of the winding 10 with all of the winding 9 in parallel to ground. This establishes the minimum inductance value necessary to provide the desired lagging current corresponding to the maximum system capacitance on the occurrence of a ground fault.

It will be observed that, inasmuch as the number of turns in the winding 9 remains fixed and is always subjected to the same line to ground voltage of the system, the flux density of the core 43 remains substantially constant. Thus regardless of the amount of the system in service, the iron of the core 42 verges so closely on saturation under line to ground voltage of the system as substantially to avoid dangerous overvoltage due to series resonance of the system capacitance and ground fault neutralizer inductance under any unbalanced capacitance conditions of the system which may arise in consequence of the configuration of the system, an open conductor, failure of the switch to open or close one or more phase conductors on sequential opening or closing of the phase conductors, or any other cause which can establish the flow of an unbalanced capacitance current to ground from the phase conductors of the system. In other words, under any condition of system capacitance to ground to be expected in the normal operation of the system, the flow of current in the winding 10 alone or in the windings 10 and 9 together is sufficient to establish a flux or fluxes tending to cause saturation and thereby to effect automatic detuning of the ground fault neutralizer on voltages to ground of the neutral point 6 exceeding line to ground voltage of the system. It will be observed that, inasmuch as the inductance range is accomplished by the use of a winding having a fixed number of turns in combination with a winding having a variable number of turns, the maximum number of extended turns on the variable winding, and accordingly the insulation cost, are materially reduced over conditions existing when any attempt is made to obtain the same inductance range with a single tapped winding.

When there is required a greater range of inductive reactance than two windings will conveniently provide, we may use additional windings with further winding core legs as schematically illustrated in Fig. 3. Thus there may be provided a third winding 90 similar to the winding 9 but on another core leg. The connection of this winding may be controlled by a position switch 380 operated in a manner similar to the operation of the switch 38 shown in Fig. 1. For simplicity, the winding 10 in Fig. 3 is illustrated as having only three taps although as many as are required may be provided.

With the arrangement shown in Fig. 3 the maximum inductance is provided with the conducting member 11 on tap 46 with both of the switches 38 and 380 open. As the conducting member 11 is moved up successively to engage the taps 47 and 48, the inductance is reduced to the minimum for the winding 10 alone. When the member 11 moves from the tap 48 to the tap 49, the switch 38 is operated to the closed position thus connecting the winding 9 in parallel with all of the winding 10. The turns of the winding 10 are then reduced as the member 11 moves to taps 50 and 51 at the latter of which the minimum amount of winding 10 is again in service. Upon movement of the member 11 from the tap 51 to the tap 52, the switch 380 is closed to connect the winding 90 in parallel with the winding 9 and all of the winding 10. Further upward movement of the member 11 through tap 53 reduces the number of turns of the winding 10 until the minimum possible inductance value is obtained on tap 54 with the windings 9 and 90 in parallel therewith. From the foregoing, it will be apparent to those skilled in the art that the number of windings can be increased and their tapping arrangements varied in accordance with the neutralizing current range required. As is the case in Figs. 1 and 2, the connections of the windings and their turn directions will be such that the fluxes in adjacent winding legs will be in opposite directions.

While we have shown and described our invention in considerable detail, we do not desire to be limited to the exact arrangements shown, but seek to cover in the appended claims all those modifications that fall within the true spirit and scope of our invention.

What we claim as new and desire to secure by Letters Patent of the United States is:

1. In an alternating current electric system having a neutral point and of the type wherein a fault to ground on a phase conductor of the system substantially increases the voltage to ground of the ungrounded phase conductors of the system and wherein the amount of the system in service may vary from time to time, arc suppressing means connected to provide a lagging current for substantially neutralizing the capacitance current to ground at a grounded point regardless of the amount of the system in service comprising a magnetic core having a plurality of legs, a first winding on one leg of said core and a second winding on another leg of said core, means for connecting any desired number of turns of said second winding directly between the neutral point of the system and ground, and means for connecting said first winding in parallel with the connected turns of said second winding.

2. In an alternating current electric system having a neutral point and of the type wherein a fault to ground on a phase conductor of the system substantially increases the voltage to ground of the ungrounded phase conductors of the system and wherein the amount of the system in service may vary from time to time, arc suppressing means connected to provide a lagging current for substantially neutralizing the capacitance current to ground at a grounded point regardless of the amount of the system in service comprising a magnetic core having a plurality of legs, a first winding on one leg of said core and a second winding on another leg of said core, means for connecting any desired number of turns of said second winding between the neutral point of the system and ground, and means for connecting said first winding in parallel with the connected turns of said second winding interlocked with the turn-connecting means thereof.

3. In an alternating current electric system having neutral point and of the type wherein a fault to ground on a phase conductor of the system substantially increases the voltage to ground of the ungrounded phase conductors of the system and wherein the amount of the system in service may vary from time to time, arc suppressing means connected to provide a lagging current for substantially neutralizing the capacitance current to ground at a grounded point regardless of the amount of the system in service comprising a magnetic core having a plurality of legs, a first winding on one leg of said core and a second winding on another leg of said core said first winding having a predetermined number of turns and operative at system line to ground voltage to maintain its core leg at a high flux density approaching saturation and said second winding having an operating range of turns for maintaining at system line to ground voltage its core leg at a high flux density approaching saturation, means for connecting the maximum number of turns of said second winding between a neutral point of the system and ground and varying the number of turns to the minimum and means for connecting said first winding in parallel with the connected turns of said second winding.

4. In an alternating current electric system having a neutral point and of the type wherein a fault to ground on a phase conductor of the system substantially increases the voltage to ground of the ungrounded phase conductors of the system and wherein the amount of the system in service may vary from time to time, arc suppressing inductive means connected to provide a lagging current for substantially neutralizing the capacitance current to ground at a grounded point regardless of the amount of the system in service comprising a magnetic core having a plurality of legs, a first winding on one leg of said core and a second winding on another leg of said core said first winding having a predetermined number of turns and operative at system line to ground voltage to maintain its core leg at a high flux density approaching saturation and said second winding having an operating range of turns for maintaining at system line to ground voltage its core leg at a high flux density approaching saturation, and means for varying the inductance of said arc suppressing means inversely with the capacitance to ground of the system in service including means for connecting different numbers of turns of said second winding between the neutral point of the system and ground and means for connecting said first winding in parallel with the connected turns of said second winding.

5. In an alternating current electric system having a neutral point and of the type wherein a fault to ground on a phase conductor of the system substantially increases the voltage to ground of the ungrounded phase conductors of the system and wherein the amount of the system in service may vary from time to time, arc suppressing means connected to provide a lagging current for substantially neutralizing the capacitance current to ground at a grounded point regardless of the amount of the system in service comprising a magnetic core having a plurality of legs, a first winding on one leg of said core and a second winding on another leg of said core said first winding having a predetermined number of turns and operative at system line to ground voltage to maintain its core leg at a high flux density approaching saturation and said second winding having an operating range of turns for maintaining at system line to ground voltage its core leg at a high flux density approaching saturation, means for connecting the maximum number of turns of said second winding between a neutral point of the system and ground and varying the number of turns to the minimum including means for subsequently connecting said first winding in parallel with the maximum number of turns of said second winding and then varying the number of turns of the second winding to the minimum.

6. In an alternating current electric system of the type wherein a fault to ground on a phase conductor of the system substantially increases the voltage to ground of the ungrounded phase conductors of the system and wherein the amount of the system in service may vary from time to time, arc suppressing inductive means connected to provide a lagging current for substantially neutralizing the capacitance current to ground at a grounded point regardless of the amount of the system in service comprising a magnetic core having a plurality of legs, a first winding on one leg of said core and a second winding on another leg of said core, said first winding having a predetermined number of turns and operative at system line to ground voltage to maintain its core leg at a high flux density approaching saturation and said second winding having an operating range of turns for maintaining at system line to ground voltage its core leg at a high flux density approaching saturation, and means for varying the inductance of said arc suppressing means inversely with the capacitance to ground of the system in service including means for connecting the maximum number of turns of said second winding between a neutral point of the system and ground to correspond to the minimum capacitance to ground of the system and varying the number of turns of said second winding to the minimum to correspond to an intermediate value of the capacitance to ground of the system including means for connecting said first winding in parallel with the maximum number of turns of said second winding to correspond to a greater intermediate value of the capacitance to ground of the system and varying the number of turns of the second winding to a minimum to correspond with the maximum capacitance to ground of the system.

7. In an alternating current electric system having a neutral point and of the type wherein a fault to ground on a phase conductor of the system substantially increases the voltage to ground of the ungrounded phase conductors of the system and wherein the amount of the system in service may vary from time to time, arc suppressing means connected to provide a lagging current for substantially neutralizing the capacitance current to ground at a grounded point regardless of the amount of the system in service comprising a magnetic core having a plurality of legs, a plurality of windings respectively positioned on a plurality of said core legs and another winding on another of said core legs, means for connecting any desired number of turns of said other winding between the neutral point of the system and ground, and means for connecting one or more of said plurality of windings in parallel with the connected turns of said other winding.

8. In an alternating current electric system having a neutral point and of the type wherein a fault to ground on a phase conductor of the system substantially increases the voltage to ground of the undergrounded phase conductors of the system and wherein the amount of the system in service may vary from time to time, arc suppressing means connected to provide a lagging current for substantially neutralizing the capacitance current to ground at a grounded point regardless of the amount of the system in service comprising a plurality of inductively wound windings, means for connecting any desired number of turns of one of said windings directly between the neutral point of the system and ground, and means for connecting another of said windings in parallel with the connected turns of said one winding.

9. In an alternating current electric system having a neutral point and of the type wherein a fault to ground on a phase conductor of the system substantially increases the voltage to ground of the ungrounded phase conductors of the system and wherein the amount of the system in service may vary from time to time, arc suppressing means connected to provide a lagging current for substantially neutralizing the capacitance current to ground at a grounded point regardless of the amount of the system in service comprising a plurality of inductively wound windings, means for connecting any desired number of turns of one of said windings between the neutral point of the system and ground, and means for connecting another of said windings in parallel with the connected turns of said one winding interlocked with the turn-connecting means thereof.

10. In an alternating current electric system having a neutral point and of the type wherein a fault to ground on a phase conductor of the system substantially increases the voltage to ground of the ungrounded phase conductors of the system and wherein the amount of the system in service may vary from time to time, arc suppressing means connected to provide a lagging current for substantially neutralizing the capacitance current to ground at a grounded point regardless of the amount of the system in service comprising a plurality of inductively wound windings, means for connecting one of said windings directly between the neutral point of the system and ground, and means for connecting another of said windings in parallel with said one winding directly between said neutral point and ground.

11. In an alternating current electric system having a neutral point and of the type wherein a fault to ground on a phase conductor of the system substantially increases the voltage to ground of the ungrounded phase conductors of the system and wherein the amount of the system in service may vary from time to time, arc suppressing means connected to provide a lagging current for substantially neutralizing the capacitance current to ground at a grounded point regardless of the amount of the system in service comprising a plurality of inductively wound windings, means for connecting one of said windings between the neutral point of the system and ground, and means for connecting another of said windings in parallel with said one winding between said neutral point and ground, and means interlocking the connecting means of said two windings.

ALANSON U. WELCH, JR.
LEVIN W. FOSTER.